US011281870B2

(12) United States Patent
Roth (10) Patent No.: US 11,281,870 B2
(45) Date of Patent: Mar. 22, 2022

(54) SYSTEM AND METHOD FOR STOCK PICKING USING RFID TAGS

(71) Applicant: AVERY DENNISON RETAIL INFORMATION SERVICES, LLC, Mentor, OH (US)

(72) Inventor: Mark W. Roth, North Miami, FL (US)

(73) Assignee: Avery Dennison Retail Information Services LLC, Mentor, OH (US)

(*) Notice: Subject to any disclaimer, the term of this patent is extended or adjusted under 35 U.S.C. 154(b) by 0 days.

(21) Appl. No.: 16/811,450

(22) Filed: Mar. 6, 2020

(65) Prior Publication Data

US 2020/0285817 A1     Sep. 10, 2020

Related U.S. Application Data

(60) Provisional application No. 62/815,478, filed on Mar. 8, 2019.

(51) Int. Cl.
    *G06K 7/10*                (2006.01)
    *H04W 4/35*              (2018.01)
    *G06Q 10/08*            (2012.01)

(52) U.S. Cl.
CPC ..... *G06K 7/10108* (2013.01); *G06K 7/10138* (2013.01); *G06K 7/10287* (2013.01); *G06K 7/10445* (2013.01); *G06K 7/10475* (2013.01); *G06Q 10/087* (2013.01); *H04W 4/35* (2018.02)

(58) Field of Classification Search
CPC .......... G06K 7/10108; G06K 7/10138; G06K 7/10287; G06K 7/10445; G06K 7/10475; G06K 7/10079; H04W 4/35; G06Q 10/087; G06Q 50/28
See application file for complete search history.

(56) References Cited

U.S. PATENT DOCUMENTS

| | | | | |
|---|---|---|---|---|
| 8,279,069 B2* | 10/2012 | Sawyer | ............... | G06K 7/10079 340/572.4 |
| 8,695,878 B2* | 4/2014 | Burnside | ............... | G07G 1/0045 235/385 |
| 9,135,481 B2* | 9/2015 | Wilkinson | ............... | G06Q 10/08 |
| 9,740,897 B1* | 8/2017 | Salour | ................ | G06K 7/10366 |
| 10,902,376 B2* | 1/2021 | Zuberi | ............... | G06K 7/10366 |

(Continued)

OTHER PUBLICATIONS

International Search Report and Written Opinion dated Jun. 5, 2020 issued in corresponding IA No. PCT/US2020/021394 filed Mar. 6, 2020.

(Continued)

*Primary Examiner* — Seung H Lee (57) ABSTRACT

A system and method for hands-free stock picking using radio frequency identification ("RFID") includes a fixed RFID reader configured to interrogate RFID tags associated with inventory that is disposed on shelving, and an RFID barrier that is configured to substantially inhibit interrogation of RFID tags associated with active inventory on the shelving. The RFID reader receives responses from the replenishment inventory on the shelving which are tabulated. When an item is picked from the active inventory and moved away from the RFID barrier, the RFID reader receives an increased number of responses for that item compared to the tabulated inventory. The system then associates the picked item with the associated customer order.

20 Claims, 4 Drawing Sheets

(56) References Cited

U.S. PATENT DOCUMENTS

| | | |
|---|---|---|
| 2006/0058913 A1 | 3/2006 | Andersen et al. |
| 2006/0255951 A1 | 11/2006 | Roeder et al. |
| 2010/0289623 A1 | 11/2010 | Roesner |
| 2013/0048724 A1 | 2/2013 | Burnside et al. |
| 2017/0337507 A1 | 11/2017 | Curry et al. |

OTHER PUBLICATIONS

International Preliminary Report, on Patentability dated Aug. 25, 2021 issued in corresponding IA No. PCT/US2020/021394 filed Mar. 6, 2020.

* cited by examiner

SYSTEM AND METHOD FOR STOCK PICKING USING RFID TAGS

CROSS REFERENCE TO RELATED APPLICATION(S)

The present application claims priority to and the benefit of U.S. provisional patent application Ser. No. 62/815,478 filed Mar. 8, 2019, which is incorporated herein by reference in its entirety.

TECHNICAL FIELD

The subject application generally relates to radio frequency identification ("RFID") tags and, more specifically, to hands free stock picking management using RFID tags.

BACKGROUND

Radio frequency systems, such Radio Frequency Identification ("RFID") systems and Near Field Communication ("NEC") systems, allow suitable transceivers to query and receive messages from nearby radio frequency tags. Such tags can allow users to perform inventory management functions without having to manually count individual articles.

Radio frequency tags can operate in various ranged such as, but not limited to, the High Frequency ("HF") range and Ultra High Frequency ("UHF") range. RFID tags often include a chip that is coupled to at least one suitable antenna, such as an antenna for RFID systems that operate in a desired range. The RFID tag receives power when excited by a nearby electromagnetic field emitted the resonant frequency of the RFID tag. Once the chip has received sufficient power, (e.g., 10 µW), the chip turns on and transmits a coded return signal or message via the coil antenna.

SUMMARY

According to certain embodiments, a radio frequency identification ("RFID") based inventory system includes an RFID reader for interrogating RFID tags on inventory, and an RFID barrier that is configured to substantially inhibit interrogation of RFID tags associated with active inventory until a picked item from the active inventory is moved away from the RFID barrier. The RFID based inventory system determines that an item is picked when there is an increase in the number of responses to the RFID interrogation.

In certain other embodiments, a method includes interrogating RFID tags associated with inventory by an RFID reader that is in proximity to inventory, and inhibiting the interrogation of an active inventory item until an item in picked and removed from proximity of the RFID barrier.

According to yet other embodiments, a method of hands-free item picking from active inventory includes transmitting a first interrogation signal, inhibiting transmission of the first interrogation signal to active inventory by an RFID barrier, receiving a plurality of first responses from substantially only the replenishment inventory, transmitting a second interrogation signal, receiving a second plurality of responses, and determining that an item was picked from active inventory using one or more of when the second plurality of response is greater in number than the first plurality of responses; an RSSI of one of the first responses is not substantially below the RSSI of other responses; and responses are received from both a picked item and a non-inventory asset such as a forklift.

BRIEF DESCRIPTION OF THE DRAWINGS

Various embodiments will become better understood with regard to the following description, appended claims, and accompanying drawings.

DETAILED DESCRIPTION

Accurate inventory management and tracking is essential to the successful operation of a modern warehouse. For example, accurate inventory management and tracking ensures adequate goods or supplies are purchased and then used or dispatched appropriately. As can be appreciated however, traditional inventory management and tracking in a warehouse is inherently prone to error, inefficiencies, and even fraud.

For example, it is difficult to accurately count and track the movement of individual items, or cases of items, to ensure that the desired product is picked from a shelf and then shipped to the proper location. The individual operator who performs the picking is required to accurately execute the picking operations to not only locate the correct items in a warehouse full of potentially vast numbers of items, but to also accurately count the proper number of items to be pulled from the shelves for the particular customer order to be filled. Errors can occur with paper forms, pick lists, hand counts, and even barcode scanning as each can involve some degree of human judgment.

Further, if hand held devices are used, such as bar code scanners, then the operator's efficiency can be impaired if the operator would otherwise need to use both hands to handle a carton or manipulate individual items. Also, if a hand held RFID scanning device is used then the operator can be required to expend time to scan particular cartons, items, or pallets of cartons decreasing worker efficiency. Additionally, many hand held RFID scanning devices have limitations in how they project RF energy which can require the operator to have to manipulate the RFID scanning device over the items in order to obtain an accurate read from the identifying RFID devices in the items, cartons, and pallets.

Although RFID devices allow for some degree of inventory management in warehouses, even the best systems can provide incomplete coverage in very large warehouse environments due to the sheer number of RFID tagged items. Further, the sheer number of individually tagged items can lead to an inability to accurately account for the location of individual items within a large warehouse.

The systems and methods provided herein resolve the challenges described above by allowing for an accurate hands-free picking process. Such a system can allow the individual worker, or picker, to focus on their primary function of physically picking items from shelves and then moving those items into a suitable area in the warehouse for shipment to customers while also providing accurate accounting and quality control processes. Generally, the present disclosure details the use of an RFID reader infrastructure which can track active goods by distinguishing between inventory, such as, but not limited to active inventory and replenishment inventory.

The systems and methods disclosed herein are described in detail by way of examples and with reference to FIGS. 1 to 4. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The systems and methods disclosed herein describe new modalities for using Radio Frequency Identification ("RFID") tags to perform inventory functions. Although the systems and methods described herein are particularly applicable to tags that include RFID communication capabilities, the disclosed structures and methodologies can be adapted for use with other types of wireless tags. For example, the systems and methods described herein can be adapted for use in Electronic Article Surveillance ("EAS") systems that use High Frequency ("HF") radio waves, nominally at 8.2 MHz, or the systems and methods can be suitably adapted for use with wireless protocols such as Bluetooth, NFC, and WiFi or IEEE 802.11 wireless transmission protocols.

Figure 1:
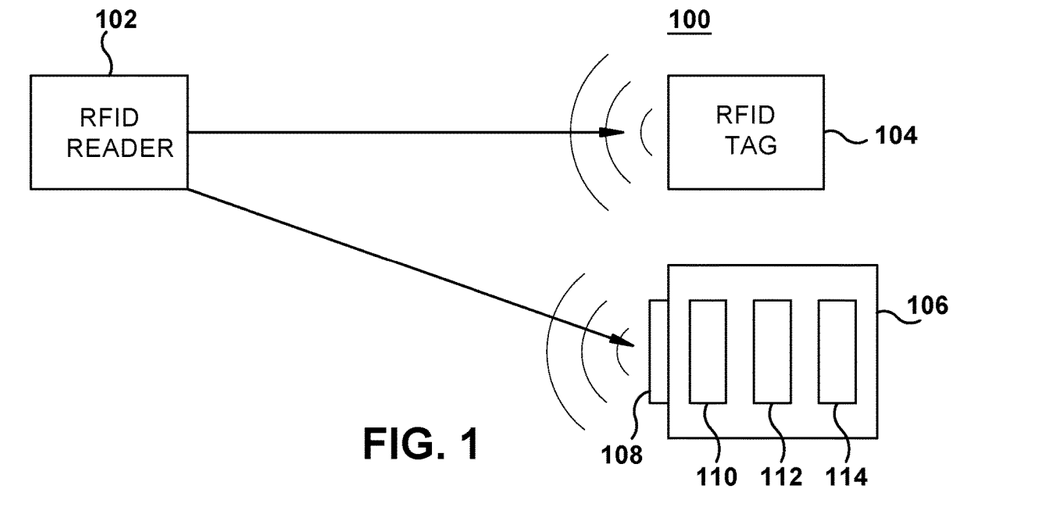
FIG. 1 depicts an embodiment of an example RFID transceiver and RFID tags.

Referring to FIG. 1, an embodiment of a simplified RFID system 100 is presented for background understanding. The RFID system 100 includes an RFID reader 102, for example a radio frequency transceiver, that is configured to interrogate one or more RFID tags 104, 108. The RFID reader 102 can transmit a radio signal and can receive information back from nearby RFID tags (e.g., 104, 108) that receive the transmitted radio signal. Each RFID tag 104, 108 that receives the radio signal can respond by sending back an encoded signal to the RFID reader 102. The encoded signal can individually identify the particular box 106 or item 110, 112, 114 to which the RFID tag 104, 108 is attached or the encoded signal can generically identify a box 106 or item 110, 112, 114 depending on how the particular RFID tag 104, 108 is encoded. For example, an RFID tag 108 can be attached to a box 106 that contains multiple individual items 110, 112, 114. Each of the individual items 110, 112, 114 in that box 106 can optionally include an individual RFID tag 104 as well if, for example, the individual items will be separated before distribution. As can be appreciated, boxes can generically contain any number of items, each with an optional RFID tag.

Placement of an RFID tag 108 on a box 106 of individual items 110, 112, 114 can facilitate inventory management operations in several ways. For example, the placement of the RFID tag 108 on the box 106 can help to ensure that the RFID reader 102 is able to interrogate the RFID tag 108. Individual items 110, 112, 114 in the box 106 may not be able to receive sufficient signal from the RFID reader 102 to transmit back a response to a query due to proximity or blocking of the signal by the box 106 itself. Also, the response from the RFID tag 108 on the box can be correlated with responses from individual items 110, 112, 114 to verify inventory counts.

Figure 2:
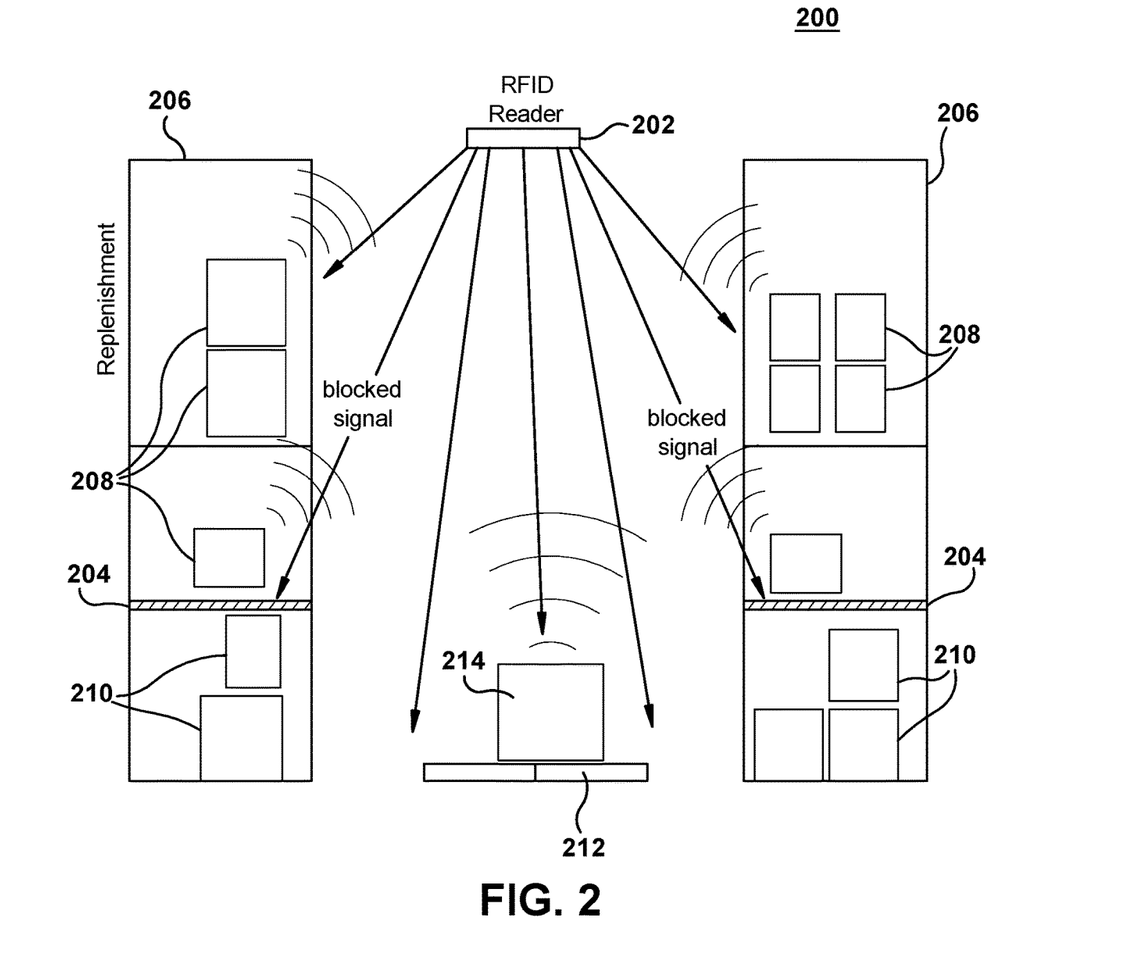
FIG. 2 depicts an embodiment of an RFID based hands-free stock picking system.

Referring now to FIG. 2, an embodiment of an RFID based hands-free stock picking system 200 is disclosed. In the RFID based hands-free stock picking system 200, an RFID reader 202 is disposed over an aisle between shelving 206 and an RFID barrier 204 is disposed on the shelving 206. Replenishment inventory 208 is disposed on one portion of the shelving 206. RFID signals from the RFID reader 202 are able to interrogate the replenishment inventory 208. Pick inventory or active inventory 210 is disposed on the shelving 206 such that RFID signals from the RFID reader 202 are blocked by the RFID barrier 204.

Example RFID readers 202 can include readers known in the art understood in the art. As can be appreciated, the RFID readers 202 can be fixed reader systems, temporarily installed reader systems, or moving reader systems. Examples of suitable RFID barriers 204 can include deck covering such as an RF reflective material such as solid metal sheets or foil, or RF absorptive materials as would be understood in the art. Additionally, or alternatively, suitable RFID barriers 204 can actively block RF signals either at the barrier or in the active inventory 210.

The RFID barrier 204 can block the RFID signals from the RFID reader 202. As a result, the fixed overhead RFID reader 202 is able to interrogate the replenishment inventory 208 but unable to interrogate the active inventory 210. In certain embodiments, the RFID reader 202 can discriminate between the replenishment inventory 208 and the active inventory 210 using software methods described later herein. Such embodiments are useful to facilitate use of the system where the RFID reader 202 can inadvertently read certain tags in the active inventory 210.

In one embodiment presently contemplated, in order to enhance an operator's or end user's productivity, efficiency and accuracy it can be understood that a visual reference, may be included with the hands-free stock picking system 200 such as a touchscreen display or other such display device. This would be advantageous to both direct and inform the operator of completeness of ongoing work task. A display may be a small wireless device attached to a user's forearm/wrist or may simply reside as a fixed unit on an asset to provide visual reference to pick order, pick location, and pick accumulation. This visual reference provides feedback to the operator as to completeness to order requirements and would be tied into the warehouse management system to handle ongoing tabulation and direction of picking task. This linkage also can act as an alarm to alert both the operator and supervisor as to incorrect or incomplete work if the asset with the pallet of goods is attempted to be moved through doorway choke points as described herein. It is also contemplated that a type of visual reference could be incorporated within the RFID reader 202 in another embodiment.

In operation, the fixed overhead RFID reader 202 can operate in a substantially or semi-continuous operation. As a result, the fixed overhead RFID reader 202 can continuously interrogate the replenishment inventory 208. The RFID based hands-free stock picking system 200 can tabulate the responses from the replenishment inventory 208.

When an item is picked from the active inventory 210 and moved into the aisle and placed on a pallet 212 (as illustrated), cart, or other movable platform, etc., the RFID signal from the fixed overhead RFID reader 202 can interrogate the picked item 214 which was previously blocked from being interrogated by the RFID barrier 204. The RFID based hands-free stock picking system 200 can determine that a picked item 214 has been removed from the active inventory 210 by comparing the tabulated responses from the replenishment inventory 208 and the additional received response from the picked item 214.

For example, when a worker, or picker, moves stock from the replenishment inventory 208 into the active inventory 210, the RFID based hands-free stock picking system 200 can detect the reduction in the number of responses from the replenishment inventory 208 compared with the previously tabulated responses. The RFID based hands-free stock picking system 200 can tabulate the number of items in the active inventory 210 by adding the reduction in responses from the replenishment inventory 208 to the tabulated active inventory 210. As picked items 214 are detected, the RFID based hands-free stock picking system 200 can subtract those items from the tabulated number of items in active inventory 210.

The RFID based hands-free stock picking system 200 can also determine when active inventory 210 needs to be replenished from replenishment inventory 208 and appropriate staff can be dispatched in advance of the active inventory 210 being depleted. Due to the high degree of worker activity, replenishment of active inventory 210 from replenishment inventory 208 is usually performed by forklift crews at specified intervals to maximize workflow and to ensure worker safety from objects that could fall from high rack or shelving locations. By tracking inventories closely, the RFID based hands-free stock picking system 200 can determine optimal times to perform such replenishment.

The RFID based hands-free stock picking system 200 can advantageously improve the picking experience by the worker. For example, the worker is not burdened with a barcode scanner for individual barcode scanning of items using, for example, a handheld scanning device. As used herein, this is a "hands-free" operation. Instead, the power and flexibility of a fixed overhead RFID reader 202 is leveraged during the pick process to monitor and tabulate the picked items 214 as they are pulled from active inventory 210 and placed onto a cart, tote, box, or pallet 212.

Figure 3:
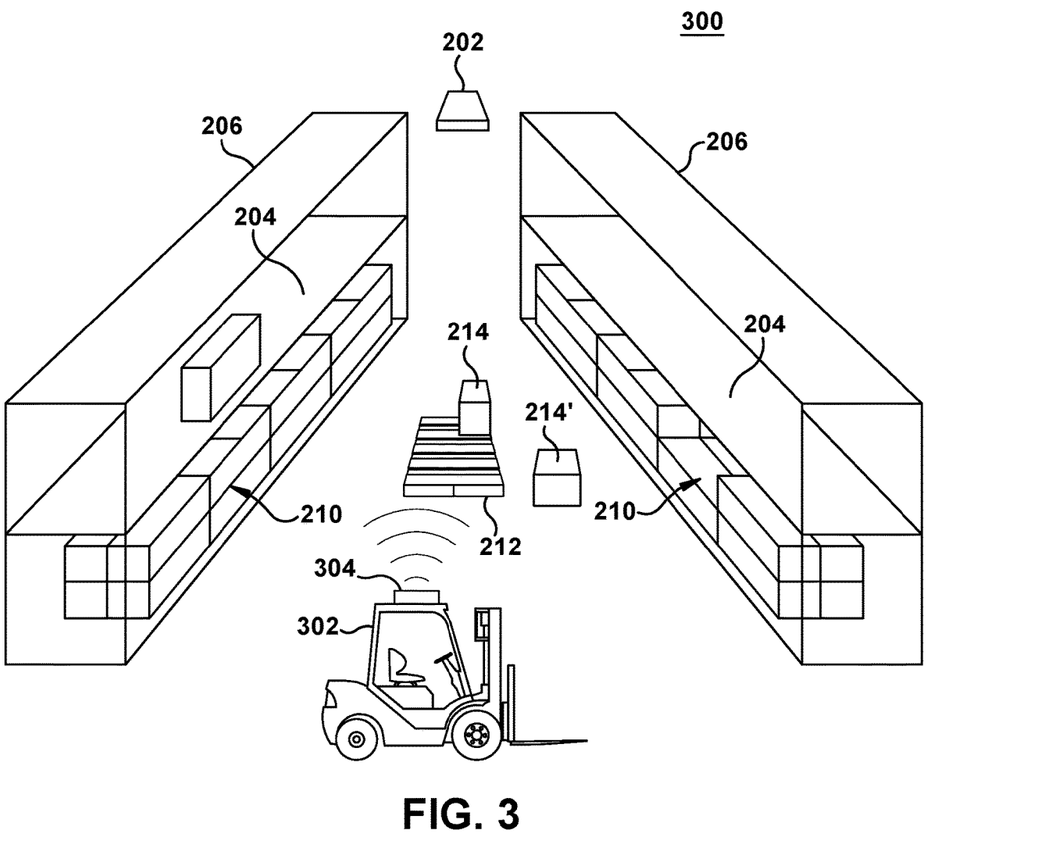
FIG. 3 depicts an embodiment of an RFID based stock picking and asset tracking system.

Referring now to FIG. 3, another embodiment of an RFID based stock picking and asset tracking system 300 is presented. As depicted in FIG. 3, a fixed overhead RFID reader 202 is disposed over an aisle between shelving 206, and an RFID barrier 204 is disposed on the shelving 206. With replenishment inventory 208 disposed on one portion of the shelving 206, RFID signals from the RFID reader 202 are able to interrogate the replenishment inventory 208 but the RFID barrier 204 blocks RF signals from active inventory 210.

In the RFID based stock picking and asset tracking system 300, each asset 302 is configured with an RFID asset tag 304. The RFID asset tag 304 can be encapsulated within a plastic housing to provide a degree of durability and longevity required in a warehouse environment so as to remain functional during the useful life of the asset 302. Example assets 302 can include a forklift as illustrated or any other material handling equipment such as the pallet 212, a pallet jack, a cart, or other movable devices as would be understood in the art.

As described above for FIG. 2, the fixed overhead RFID reader 202 continuously or semi-continuously interrogates the replenishment inventory 208. The RFID based stock picking and asset tracking system 300 can place these reads into a suitable table or database so as to be able to determine when there is an increased number of reads during a stock picking event. When the asset 302 moves into the proximity of the fixed overhead RFID reader 202, the RFID based stock picking and asset tracking system 300 can detect the RFID asset tag 304 of the asset 302 as a trigger event. Once a trigger event has occurred, the RFID based stock picking and asset tracking system 300 can detect additional RFID responses as picked items 214. For example, as picked items 214 are removed from active inventory 210 and placed onto pallets 212, the fixed overhead RFID reader 202 can detect the elevated number of responses from the picked items 214 by comparing the number of previous responses from the replenishment inventory 208 that are stored on the table. The RFID based stock picking and asset tracking system 300 can record these new reads as picks from active inventory 210 and can associate these new responses from the picked items 214 with the asset 302.

As can be appreciated, although the RFID barrier 204 can substantially or completely block all RFID energy from reaching the active inventory 210, some RFID energy from the fixed overhead RFID reader 202 or another RFID reader may reach portions of the active inventory 210 leading to unintended reads. Advantageously, by waiting for a trigger event, such as when an asset 302 moves into range of the fixed overhead RFID reader 202, the RFID based stock picking and asset tracking system 300 can suppress spurious inadvertent reads from active inventory 210.

Additionally, the RFID based stock picking and asset tracking system 300 can suppress inadvertent reads from active inventory 210 through software and other techniques. For example, when the fixed overhead RFID reader 202 receives a response from an RFID tag, the fixed overhead RFID reader 202 can determine an RSSI or received signal strength indicator value of the response. RFID based stock picking and asset tracking system 300 can suppress those reads that have substantially lower RSSI values, indicating active inventory 210, than reads from the replenishment inventory 208. Additionally, the RFID based stock picking and asset tracking system 300 can detect and track those reads that have both lower RSSI values and are spurious in nature, which combined suggest that those reads are from active inventory 210.

Figure 4:
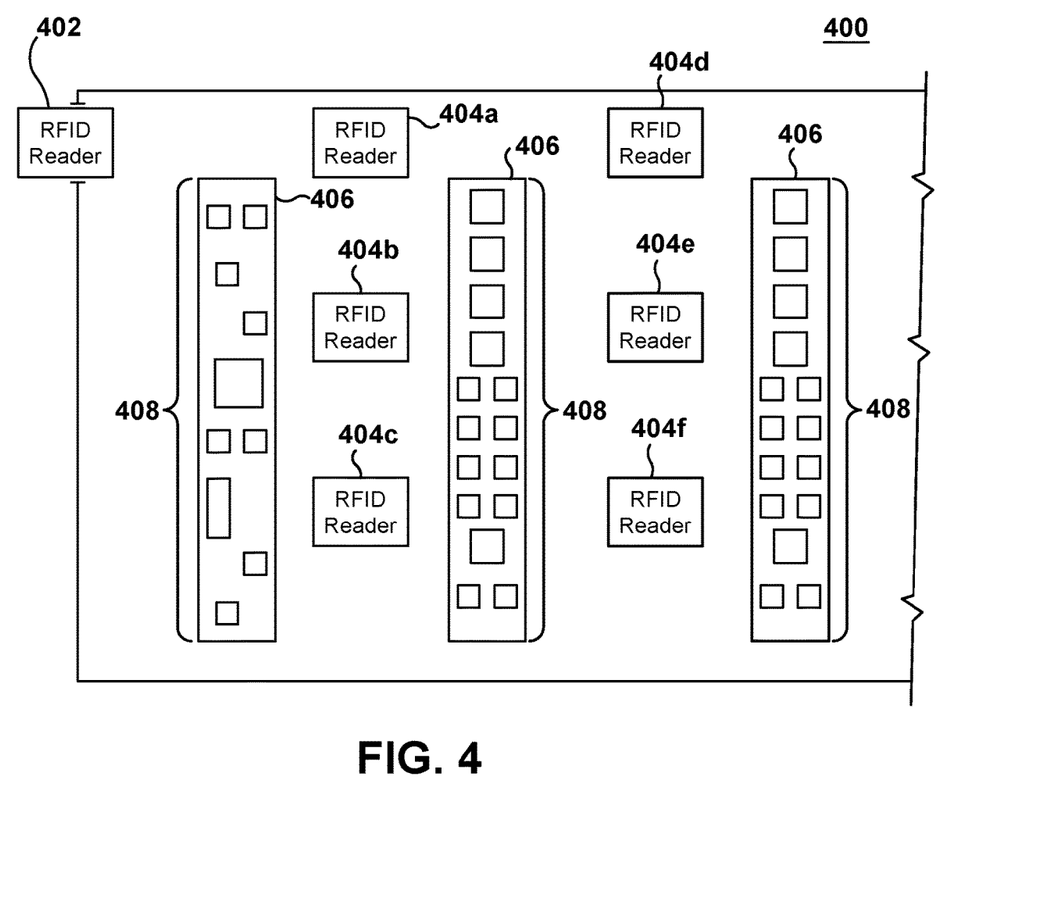
FIG. 4 depicts an embodiment of an RFID stock tracking system.

Referring now to FIG. 4, an embodiment of an RFID based stock tracking system 400 is presented. The RFID based stock tracking system 400 includes a plurality of RFID readers disposed in and around a warehouse or other environment. In certain embodiments, the RFID readers can be deployed to cover an entire facility. For example, the RFID readers can be distributed so as to cover choke points such as doorways between adjoining sections of a building. In particular embodiments, RFID readers 402 can be disposed proximate to an entrance leading to a shipping area, while other RFID readers 404a, 404b, 404c, 404d, 404e, 404f (collectively RFID readers 404) can be disposed along aisles between shelving 406. The RFID readers 404 disposed along aisles between shelving 406 can track item picking from inventory 408 as described above with regard to FIGS. 2 and 3. RFID readers 402 can also be used to further improve the accuracy of the RFID based stock tracking system 400 to determine if items have been moved from replenishment inventory 208 to active inventory 210.

In certain embodiments, the RFID readers 402, 404 can be configured to monitor the movement of RFID tagged items throughout a facility, for example, the movement of picked items and associated assets as described above. The RFID based stock tracking system 400 can monitor picked items and associated assets as then travel in the facility and pass within proximity of the RFID readers 402, 404. The RFID based stock tracking system 400 can determine if the operator picked the proper items and ensure that the picked items are being transferred to the correct location for distribution to individual retail stores or other regional distribution centers. The RFID based stock tracking system 400 can determine if a particular pallet has been loaded with all of the items necessary to fulfil a customer's order. The RFID based stock tracking system 400 can track the progress of customer orders so as to provide real time tracking updates or projected delivery times of picked items to customers and also to other departments associated with the facility. For example, delivery personnel can be updated with the status of an order for a particular customer's order are picked by an operator and placed onto a pallet for future delivery. This advantageously can allow various departments to work together to manage work flow.

By tracking assets and associated pick items as they move about a facility, the RFID based stock tracking system 400 can also analyze work flow patterns. For example, the RFID based stock tracking system 400 can monitor which worker picked which items and combine that information with the particular asset that was used in the picking process to accomplish the task. This allows the RFID based stock tracking system 400 to compile valuable data around utilization rates and route management efficiency within a facility. In certain embodiments, the RFID based stock tracking system 400 can provide graphical representations to assist in developing better route management and increasing efficiency. For example, the RFID based stock tracking system 400 can determine if operators are consistently being delayed at choke points and reroute operators or change the order in which picks from inventory are made. The RFID based stock tracking system 400 can also determine optimal placement for inventory 408 on the shelving 406 to maximize worker efficiency.

As describe above with regard to FIG. 2, active inventory may need to be replenished from replenishment inventory. This may require forklift crews to cordon off portions of aisles at specified intervals to ensure worker safety from objects that could fall from high rack or shelving locations. The RFID based stock tracking system 400 can evaluate traffic flows and monitor active picking to determine optimal times to perform replenishment. The RFID based stock tracking system 400 can reroute pick staff to ensure optimal workflow during stock replenishment operations.

As can be appreciated, the systems and methods described herein can provide numerous advantages to both warehouse owners and the pickers. Pickers benefit by being able to focus on movement of assets or inventory without the need to handle paper forms, pick lists, hand counts, or scanning of barcodes or RFID tags. Warehouse owners benefit from accurate inventory counts, improved efficiencies in the movement of their goods, and a better understanding of how to distribute items to end customers.

The values disclosed herein are not to be understood as being strictly limited to the exact numerical values recited. Instead, unless otherwise specified, each such dimension is intended to mean both the recited value and a functionally equivalent range surrounding that value. It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A radio frequency identification ("RFID") based inventory system, comprising:
   an RFID reader configured to interrogate RFID devices associated with inventory; and
   an RFID barrier configured to inhibit interrogation of RFID devices associated with active inventory until an active inventory item is picked and removed from behind the RFID barrier relative to the RFID reader,
   wherein the RFID based inventory system determines when an item has been picked from active inventory based at least in part on an increase in a number of responses to the interrogation by the RFID reader, wherein each response corresponds to a separate RFID device.

2. The RFID based inventory system of claim 1, wherein RFID barrier is selected from the group consisting of a metal shelf, a metal plate, a metal foil, a radio frequency ("RF") reflective material, and an RF absorbing material.

3. The RFID based inventory system of claim 1, wherein the inventory comprises a replenishment inventory and the active inventory, and wherein the RFID barrier is disposed between the replenishment inventory and the active inventory.

4. The RFID based inventory system of claim 3, wherein the RFID reader is a fixed RFID reader and is disposed in an aisle to the replenishment inventory.

5. The RFID based inventory system of claim 4, wherein the RFID reader is a fixed RFID reader disposed in an aisle between shelving units.

6. The RFID based inventory system of claim 3, further comprising:
   shelving configured to hold the replenishment inventory and the active inventory,
   wherein the replenishment inventory is disposed above the active inventory on the shelving.

7. RFID based inventory system of claim 3, wherein the RFID reader is configured to continuously interrogate the replenishment inventory.

8. The RFID based inventory system of claim 3, wherein the RFID reader is configured to determine a received signal strength indicator (RSSI) of a response from an interrogated RFID device.

9. RFID based inventory system of claim 1, wherein RFID based inventory system is configured to determine, based at least in part on the RSSI, when a response to an interrogation is from an RFID associated with active inventory.

10. The RFID based inventory system of claim 1, further comprising:
an asset having an RFID device and configured to receive the picked item from the active inventory,
wherein the RFID based inventory system is configured to track the picked item only when the RFID reader receives a response from the RFID device associated with the asset and a response from the RFID device associated with the picked item.

11. The RFID based inventory system of claim 10, wherein the asset is selected from the group consisting of a forklift, a pallet, a pallet jack, and a cart.

12. The RFID based inventory system of claim 1, further comprising:
a plurality of RFID readers disposed in a facility and configured to track the asset and the picked item during movement through the facility.

13. A method comprising:
interrogating, by an RFID reader, RFID devices associated with inventory; and
inhibiting, by an RFID barrier disposed in the inventory, interrogation of an RFID device associated with an active inventory item by the RFID reader until the active inventory item is picked and removed from behind the RFID barrier relative to the RFID reader, wherein the RFID reader is disposed within reading range of the inventory.

14. The method of claim 13, wherein the inventory comprises a replenishment inventory and the active inventory, wherein the RFID barrier is disposed between the replenishment inventory and the active inventory, and wherein RFID barrier is selected from the group consisting of a metal shelf, a metal plate, a metal foil, a radio frequency ("RF") reflective material, and an RF absorbing material.

15. The method of claim 14, further comprising:
determining an inventory count of the replenishment inventory based on the number of responses from interrogated RFID devices.

16. The method of claim 15, further comprising:
determining, by the RFID reader, a received signal strength indicator (RSSI) of a response from an interrogated RFID device, and
suppressing, from the inventory count, the response when the RSSI is below the RSSI of responses from the replenishment inventory.

17. The method of claim 15, further comprising:
determining that an item has been picked from active inventory based on an increase in the number of responses of interrogated RFID devices above the inventory count.

18. The method of claim 17, further comprising:
receiving, in response to the interrogating by an RFID reader, a response from an RFID device associated with a non-inventory asset;
associating the picked item from active inventory with the non-inventory asset; and
tracking, via a plurality of RFID readers disposed in a facility, the picked item and the non-inventory asset during movement through the facility.

19. A method of hands-free item picking from active inventory, comprising:
transmitting, by an RFID reader, a first RFID interrogation signal within reading range of inventory comprising replenishment inventory and active inventory;
inhibiting, by an RFID barrier disposed between the active inventory and the RFID reader, transmission of the first RFID interrogation signal to the active inventory;
receiving, by the RFID reader and only from the replenishment inventory, a plurality of first responses to the first RFID interrogation signal, wherein each first response corresponds to a separate RFID device;
determining, from the first plurality of responses, the replenishment inventory;
transmitting, by an RFID reader, a second RFID interrogation signal;
receiving, by the RFID reader, a plurality of second responses to the second RFID interrogation signal, wherein each second response corresponds to a separate RFID device;
determining, by the RFID reader, that an item was picked from active inventory using one or more of:
the plurality of second responses is greater in number than the plurality of first responses;
an RSSI associated with a response from the picked item is not below the RSSI of responses from the replenishment inventory indicating that the item was picked and removed away from the RFID barrier; and
the RFID reader received both a response from the picked item and a response from an RFID device associated with a non-inventory asset in response to the second RFID interrogation signal.

20. The method of hands-free item picking from active inventory of claim 19, further comprising:
transmitting, by a plurality of different RFID readers in a facility, a plurality of RFID interrogation signals;
receiving, from at least one of the plurality of different RFID readers, a response from at least the picked item or an associated non-inventory asset; and
tracking the picked item or the associated non-inventory asset in the facility based at least in part on the response.

* * * * *